UNITED STATES PATENT OFFICE.

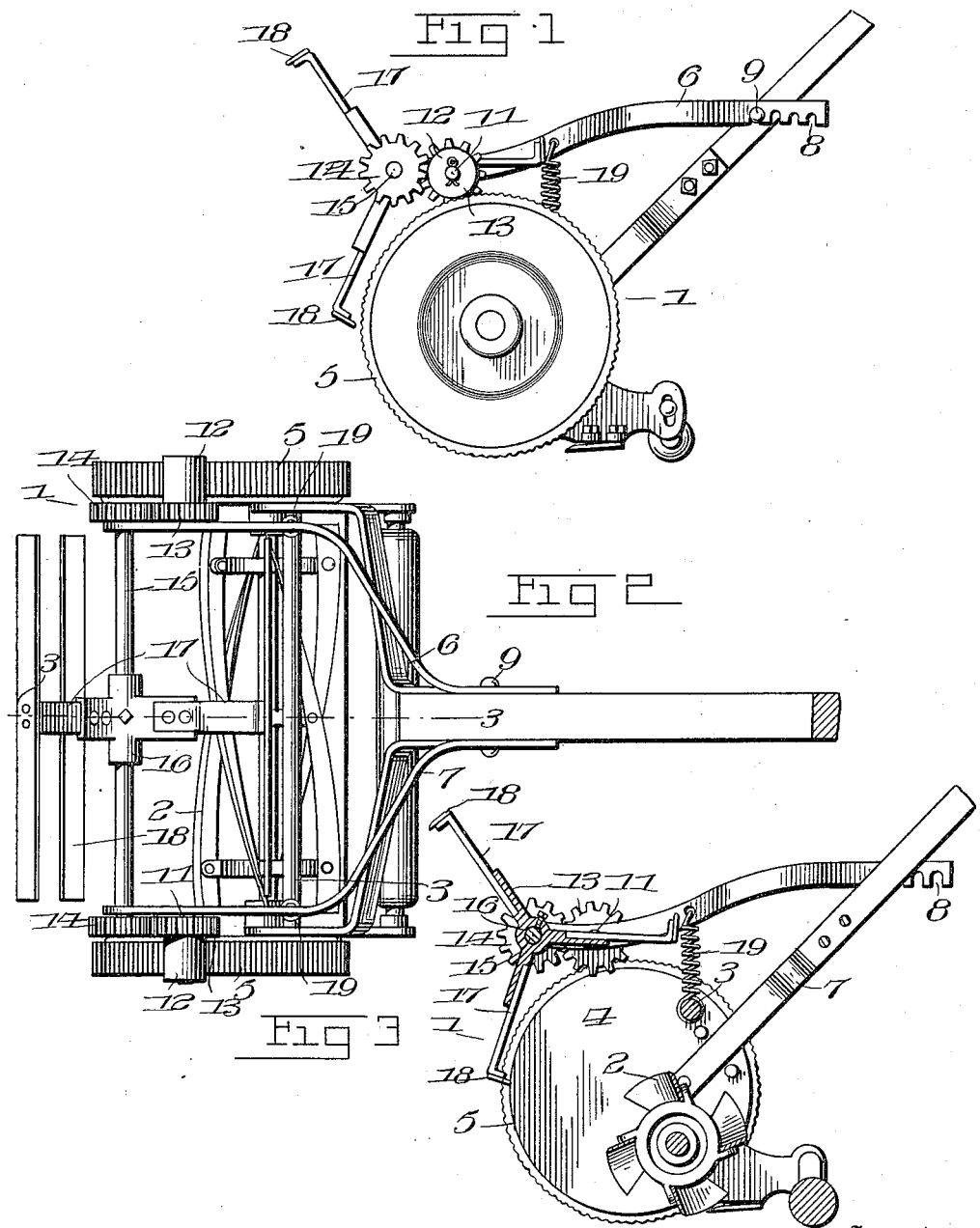

FRANK J. ANDERLA, OF ELYRIA, OHIO.

LAWN-MOWER ATTACHMENT.

1,069,513.  Specification of Letters Patent.  Patented Aug. 5, 1913.

Application filed August 23, 1912. Serial No. 716,730.

*To all whom it may concern:*

Be it known that I, FRANK J. ANDERLA, a citizen of the United States, residing at Elyria, in the county of Lorain and State of Ohio, have invented new and useful Improvements in Lawn-Mower Attachments, of which the following is a specification.

This invention relates to attachments for lawn mowers.

Heretofore, it has been extremely difficult to cut long grass or weeds with a lawn mower comprising the circular type of cutter.

It is the object of this invention, therefore, to provide an efficient and cheaply constructed device which may be readily attached to any lawn mower and is adapted to throw the long grass or weeds into the path of the cutter and prevent the same from being bent down.

Further objects of this invention will appear as the following specific description is read in connection with the accompanying drawing, which forms a part of this application, and in which:—

Figure 1 is a side elevation. Fig. 2 is a top plan view. Fig. 3 is a section taken on the line 3—3 of Fig. 2.

Referring more particularly to the drawing, 1 represents an ordinary lawn mower having rotating cutting knives 2 and a bracing shaft or bar 3 extending between the ratchet heads 4 of the machine. The machine is also provided with the usual tractor wheels 5.

The attachment comprises a pair of separate diverging rods 6 and 7 which are each provided with notches 8 in their rear ends adapted to engage over one of the handle bolts 9 so as to adjust the members 6 and 7 toward and away from the handle. The outer ends of these members 6 and 7 extend in parallel lines and each have journaled therein a stub shaft 11 upon which a friction roller 12 is mounted in such a manner as to bear directly against the traction wheels 5. The inner ends of the stub shafts are provided with gears 13 which are in mesh with similar gears 14 carried at the ends of the shaft 15 which is journaled in the members 6 and 7. This shaft has secured to the center thereof a hub 16 with radiating arms 17 to which are secured the wings 18, as shown. When the rollers 12 are held in engagement with the wheel 5, the shaft 15 will be caused to rotate in a direction similar to the rotation of the wheels and will cause the wings or paddles 18 to engage the grass in front of the cutters and hold the same in perpendicular position until engaged by said cutters. In this manner, long grass may be readily cut without employing the reciprocating sickle bar.

In order to hold the rollers 12 in engagement with the wheels 5, I preferably employ a pair of spiral springs 19 which interconnect the outer ends of the arms 6 and 7 with the bracing rod 3. The wheels 12 are preferably made of or covered with some material like rubber in order that a good frictional contact with the wheels 5 may be obtained.

What is claimed is:—

1. An attachment for lawn mowers comprising mounting arms, means for adjustably mounting the arms upon the handle of the mower, said arms extending forward above the wheels of the mower, a reel rotatably mounted in the arms, a driving connection between the reel and the wheels of the mower, and a spring for holding the driving connection in operative position.

2. An attachment for lawn mowers comprising mounting arms, means for adjustably connecting one end of the arms upon the handle of the mower said arms extending forward above the wheels of the mower, a reel journaled in the opposite ends of the arms, gears on the reel shaft, stub shafts secured to the arms adjacent the gears, gears on the stub shafts meshing with the first gears, and springs for drawing the friction wheels into engagement with the wheels of the mower.

In testimony whereof I affix my signature in presence of two witnesses.

FRANK J. ANDERLA.

Witnesses:
GEO. SCHNEIDER,
WALTER WYKRAUT.

Copies of this patent may be obtained for five cents each, by addressing the "Commissioner of Patents, Washington, D. C."